(12) United States Patent
Mestha et al.

(10) Patent No.: US 8,159,715 B2
(45) Date of Patent: Apr. 17, 2012

(54) METHOD, APPARATUS AND SYSTEMS TO RETRIEVE GCRS FROM HISTORICAL DATABASE

(75) Inventors: Lalit K. Mestha, Fairport, NY (US); Alvaro E. Gil, Rochester, NY (US); Yao Rong Wang, Webster, NY (US); Zhigang Fan, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 986 days.

(21) Appl. No.: 12/127,643

(22) Filed: May 27, 2008

(65) Prior Publication Data

US 2009/0296107 A1 Dec. 3, 2009

(51) Int. Cl.
*H04N 1/60* (2006.01)
*H04N 1/46* (2006.01)
*H04N 1/40* (2006.01)
*G03F 3/08* (2006.01)

(52) U.S. Cl. ......... 358/1.9; 358/504; 358/518; 358/523; 358/3.23

(58) Field of Classification Search ............ 358/1.9, 358/504, 518, 523, 3.23
See application file for complete search history.

(56) References Cited

U.S. PATENT DOCUMENTS

| | | | |
|---|---|---|---|
| 5,502,579 A | 3/1996 | Kita et al. | |
| 5,636,290 A | 6/1997 | Kita et al. | |
| 6,744,531 B1 | 6/2004 | Mestha et al. | |
| 7,729,014 B2 * | 6/2010 | Falk et al. | 358/2.1 |
| 8,014,024 B2 * | 9/2011 | Viturro et al. | 358/1.9 |

OTHER PUBLICATIONS

R. Bala, "Device Characterization", Chapter 5, Digital Color Imaging Handbook, Gaurav Sharma Ed., CRC Press, 2003.
R. Balasubramanian, R. Eschbach, "Design of UCR and GCR strategies to reduce moiré in color printing", IS&TPICS Conference, pp. 390-393, 1999.
R. Balasubramanian, R. Eschbach, "Reducing multi-separation color moiré via a variable undercolor removal and gray-component replacement strategy", Journal of Imaging Science & Technology, vol. 45, No. 2, pp. 152-160, Mar./Apr. 2001.
S. Dianat, LK Mestha, A. Mathew, "Dynamic Optimization Algorithm for Generating Inverse Printer Maps with Reduced Measurements," IEEE Int. Conference on Acoustics, Speech, and Signal Processing, May 14-19, 2006, Toulouse, France.
Mestha et al., "Gray Balance Control Loop for Digital Color Printing Systems," Xerox Corporation, Sep. 18-23, 2005, Baltimore MD, 6 pages.
U.S. Appl. No. 11/585,463, filed Oct. 24, 2006, Mestha et al.
U.S. Appl. No. 11/959,824, filed Dec. 19, 2007, Mestha et al.
U.S. Appl. No. 12/017,746, filed Jan. 22, 2008, Mestha et al.
U.S. Appl. No. 12/127,473, filed May 27, 2008, Wang et al.
U.S. Appl. No. 12/127,728, filed May 27, 2008, Maltz et al.
U.S. Appl. No. 12/127,719, filed May 27, 2008, Gil et al.

* cited by examiner

*Primary Examiner* — Charlotte M Baker
(74) *Attorney, Agent, or Firm* — Fay Sharpe LLP (57) ABSTRACT

This disclosure provides methods, apparatus and systems for generating a profile for a printing device. Specifically, the profile is generated by selecting a GCR profile from a plurality of GCR profiles and mapping a plurality of nodes to a device dependent color space as a function of the selected GCR profiles.

21 Claims, 9 Drawing Sheets

METHOD, APPARATUS AND SYSTEMS TO RETRIEVE GCRS FROM HISTORICAL DATABASE

CROSS REFERENCE TO RELATED PATENTS AND APPLICATIONS

U.S. patent application Ser. No. 12/127,719, filed May 27, 2008, entitled "COOPERATIVE NEIGHBOR PRINTING SYSTEM PROFILE METHODS AND SYSTEMS," by Gil et al.;

U.S. patent application Ser. No. 12/127,728, filed May 27, 2008, entitled "PRINTER PROFILING METHODS, APPARATUS AND SYSTEMS FOR DETERMINING DEVICE AND GAIN MATRIX VALUES," by Maltz et al.;

U.S. patent application Ser. No. 12/127,473, filed May 27, 2008, entitled "METHODS, APPARATUS AND SYSTEMS FOR BLENDING MULTIPLE GCRS," by Wang et al.; and

BACKGROUND

This disclosure relates to printing systems. Specifically, this disclosure relates to methods and systems to generate profiles for one or more printing devices.

Documents that are representations in either electronic or print format inclusive of color graphics or other illustrative forms are generally created electronically in the "creative" stage of the production workflow with sections from various input devices such as, for example, scanners, cameras, computer graphics, etc. In this workflow, the documents are designed using various layout tools and their color appearance is fine tuned by typically proofing on a workgroup digital printer or the press itself. When the prints are made, it is expected that the appearance on the destination printer follows the proof. If it does not follow the proof, then adjustments are made to many places including color management profile LUTs. One of the key adjustments is the selection of GCR (Gray Component Replacement) methods. The GCR methods fine tune the use of CMYK separations for improving the appearance. Particularly some of the key colors (e.g., black in flesh tones and sky tones) need less black. Sometimes, maximum gamut GCR is preferred over medium GCR to utilize the gamut fully. These adjustments are stored as standard profiles (e.g., ICC profiles).

When a job has already been produced, and a future reprint may be expected, then the color in the future reprint has to be retrieved from the original electronic documents with the original design and the embedded or associated graphics intact.

In image production systems that produce images on a recording medium, such as printers, photocopiers, facsimile machines and other xerographic devices, it is desired to control, as closely as possible, the actual perceived color of the output images. One known method to optimize image color output is to provide a look-up-table (LUT) that translates received color signals into optimized color signals for printing, for example, on a printer.

It is known, for example, that in three-color spaces, such as a Cyan-Magenta-Yellow (CMY) color space, gray color is made up of equal, or near-equal amounts of each one of the colors of the three-color space. Each color in a three-color space which is made up of non-negligible amounts of all three primary colors of the color space can be viewed as having a gray component. Expanding the three-color space to include Black (K) allows then, for most colors in the color space, for a black (K) component to be added in substitution for the gray component. In such a solution, a three-input, four-output LUT is needed.

Another method is discussed in (1) R. Balasubramanian, R. Eschbach, "Design of UCR and GCR strategies to reduce moire in color printing", IS&TPICS Conference, pp. 390-393 (1999) and (2) R. Balasubramanian, R. Eschbach, "Reducing multi-separation color moire via a variable undercolor removal and gray-component replacement strategy", Journ. Imaging Science & Technology, vol. 45, no. 2, pp. 152-160, March/April, 2001. A UCR/GCR strategy is proposed that is optimized to reduce moire. In this method, the UCR/GCR strategy is to characterize moire as a function of the color components and to select optimized output color components when the moire function is minimized.

INCORPORATION BY REFERENCE

U.S. patent application Ser. No. 11/585,463 filed Oct. 24, 2006, entitled "METHOD AND SYSTEM FOR ACQUISITION AND STORAGE OF IMAGE JOB MODEL INCLUDING IMAGE INFORMATION AND IMAGING DEVICE PRODUCTION STATE PERFORMANCE INFORMATION," by L. K. Mestha, A. L. McCarthy and S. V. Revankar;

U.S. Pat. No. 5,502,579, issued Mar. 26, 1996, entitled: "COLOR IMAGE PROCESSING METHOD AND APPARATUS CAPABLE OF ADJUSTING THE UCR RATIO," to Kita et al.;

U.S. Pat. No. 5,636,290, issued Jun. 3, 1997, entitled: "COLOR IMAGE PROCESSING," to Kita et al.;

U.S. Pat. No. 6,744,531, issued Jun. 1, 2004, entitled "COLOR ADJUSTMENT APPARATUS AND METHOD," to Mestha et al.;

R. Bala, "Device Characterization," Chapter 5, Digital Color Imaging Handbook, Gaurav Sharma Ed., CRC Press, 2003;

R. Balasubramanian, R. Eschbach, "Design of UCR and GCR strategies to reduce moire in color printing," IS&T PICS Conference, pp. 390-393 (1999); and R. Balasubramanian, R. Eschbach, "Reducing multi-separation color moiré via a variable undercolor removal and gray-component replacement strategy," Journal Imaging Science & Technology, vol. 45, no. 2, pp. 152-160, March/April, 2001 are herein incorporated by reference in their entirety.

BRIEF DESCRIPTION

According to one aspect of this disclosure, a method for generating a profile for a printing device is disclosed. The method for generating the profile comprises a) receiving color signals defining a plurality of nodes in a device independent color space; b) selecting a GCR profile from a plurality of GCR profiles based on one or more predetermined criteria; c) generating a set of device dependent color space values from the received color signals and selected GCR profile; d) running a process to generate the printer profile for the printing device, the printer profile mapping the received color signals to the device dependent color space values, wherein the device dependent color space values include the selected GCR profiles; and e) performing one of storing the printer profile, further processing the printer profile and communicating the printer profile to a data receiving device.

According to another aspect of this disclosure, a printing apparatus controller is disclosed which comprises a computer-usable data carrier storing instructions that, when executed by the controller, cause the controller to perform a method for generating a profile for a printing device comprising a) receiving color signals defining a plurality of nodes in a device independent color space; b) selecting a GCR profile from a plurality of GCR profiles based on one or more predetermined criteria; c) generating a set of device dependent color space values from the received color signals and selected GCR profile; d) running a process to generate the printer profile for the printing device, the printer profile mapping the received color signals to the device dependent color space values, wherein the device dependent color space values include the selected GCR profiles; and e) performing one of storing the printer profile, further processing the printer profile and communicating the printer profile to a data receiving device.

According to still another aspect of this disclosure, a printing system is disclosed which comprises of one or more IMEs (Image Marking Engines); an image sensor operatively connected to the one or more IMEs; and a controller operatively connected to the one or more IMEs and the image sensor, the controller configured to execute a method for generating a profile for the one or more IMEs, the method comprising a) receiving color signals defining a plurality of nodes in a device independent color space; b) selecting a GCR profile from a plurality of GCR profiles based on one or more predetermined criteria; c) generating a set of device dependent color space values from the received color signals and selected GCR profile; d) running a process to generate the printer profile for the printing device, the printer profile mapping the received color signals to the device dependent color space values, wherein the device dependent color space values include the selected GCR profiles; and e) performing one of storing the printer profile, further processing the printer profile and communicating the printer profile to a data receiving device.

DETAILED DESCRIPTION

This disclosure provides methods, apparatus and systems to reproduce images by retrieving GCRs from different sources. Direct use of a GCR from a single source may produce contours and other undesirable image artifacts. Substantively, if the pre-conditioning/processing method disclosed is applied to a custom profile, then the GCRs can be reproduced with reasonable precision to the desired GCRs resulting in expected image quality appearance in documents. According to one exemplary embodiment, the pre-conditioning method includes the following process steps; (1) run advanced controls (iterations) on the appropriate printer model or printer using the original GCR contained in the input profile as the desired target GCR, (2) filter the CMYK values generated from step #1, if required, (3) re-run steps 1 and 2 if required in a computer program. These steps have been tested with over 11 different GCRs with control based profiling technology for both iterating on the printer model (IOPM) and iterating on the printer (IOP). All the tests exhibited good relationships to the desired GCR.

The most efficient way to change the saturation of a given color while maintaining the same hue angle is to use the Key (Black) component. The act of substituting a quantity of black is known as "Grey Component Replacement." (GCR) For example, the CMY values that add to grey along the tone scale can be replaced with black separation. Gray component replacement only adds black to the CMY equivalent of grey. There are many advantages to add black to the CMY equivalent. Black toner generally costs less and black gives better stability to prints in the presence of print variables (relative humidity, temperature, material latitude etc.). Increased gamut to dark colors may also be achieved with the addition of black toner. One major disadvantage in adding black is the excessive black in flesh tones, sky tones and other important tone scales. These tone scales can appear dirty/grainy or non-uniform with black toner.

Since GCR plays an important role in high quality color reproduction using toner or inks, generally print vendors fine tune the addition of black intelligently either by using complex algorithms or by using carefully designed experiments. Experiments are often done with many iterations. Once the tuning is done, the disclosed method/system provides a mean to recreate those prints with similar black composition wherever necessary on a different or the same printer. Notably, if the recreation cannot be done automatically, it can take many days of manual iterations on the printer before the desired GCRs can be retrieved.

The disclosed method/system relates to retrieving historical GCRs automatically to render a close replica of the original GCRs.

As briefly discussed above, this disclosure provides accurate ways to reproduce images by retrieving GCRs from different sources. Direct use of GCRs from the profile files (e.g., ICC profile) produce contours and other undesirable image artifacts. In comparison, the pre-conditioning method disclosed is applied to the custom profile, then the GCRs can be reproduced with reasonable precision to the desired GCRs resulting in expected image quality appearance in documents. For example, the image quality can be void of graininess due to excessive use of black toner, if the desired GCR contained less black for important tone scales. Notably, sometimes low toner usage GCRs are preferred using this disclosure, and using the disclosed method and system can be retrieved on other machines from profile files automatically.

Figure 1:
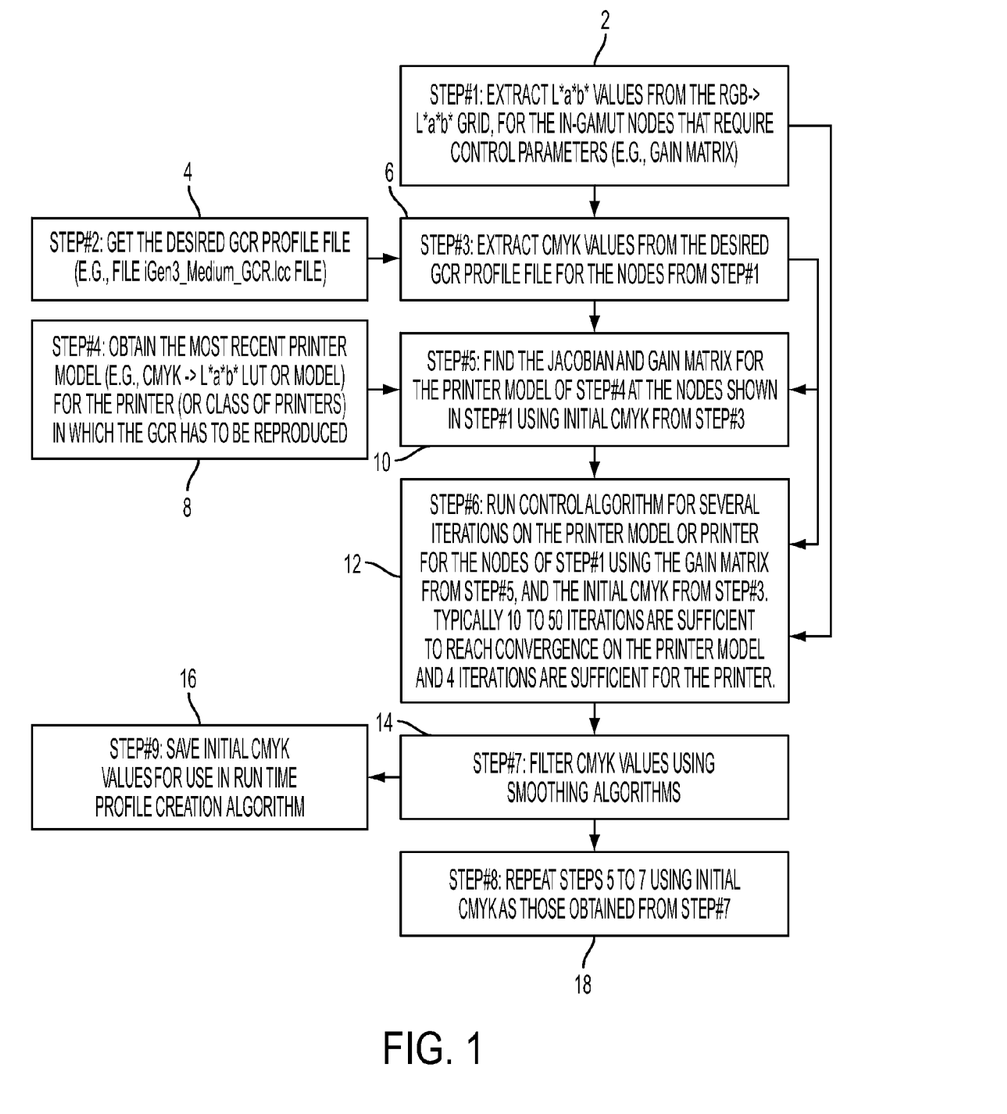
FIG. 1 is a flow chart illustrating a method for generating a profile for a printing device according to an exemplary embodiment of this disclosure.

With reference to FIG. 1, illustrated is a flow chart explaining a process of generating a profile for a printing device according to an exemplary embodiment of this disclosure. The process operates as follows:

Step one 2, extract $L^*a^*b^*$ values from the RGB->$L^*a^*b^*$ grid for the in-gamut nodes that require control parameters (e.g., gain matrix);

Step two 4, get the desired GCR profile file (e.g., FILEiGen3_Medium_GCR.IccFILE);

Step three 6, extract CMYK values from the desired GCR profile file for the nodes from step one;

Step four 8, obtain the most recent printer model (e.g., CMYK->$L^*a^*b^*$ LUT or model) for the printer (or class of printers) in which the GCR has to be reproduced;

Step five 10, find the Jacobian and gain matrix for the printer model of step four at the nodes shown in step one using initial CMYK from step 3;

Step six 12, run the control algorithm for several iterations on the printer model or printer for the nodes of step one using the gain matrix from step five and the initial CMYK from step 3. Typically 10 to 50 iterations are used to while iterating on the printer model sufficient to reach convergence on the printer model and two to four iterations are used while iterating on the printer when measurements are made on a media printed on a sheet fed press. Number iterations are limited to few while iterating on the printer because of it would require use of more paper and customer time. On a continuous feed machine, if the sensor is instrumented to take measurements on a continuous basis on a moving paper on the side and is trimmed before finishing, then number of iterations may not become so critical.

Step seven 14, filter CMYK values using smoothing algorithms;

Step eight 18, repeat steps five to seven using initial CMYK as those obtained from step seven;

Step nine 16, save initial CMYK values for use in run time profile creations algorithm.

Figure 2:
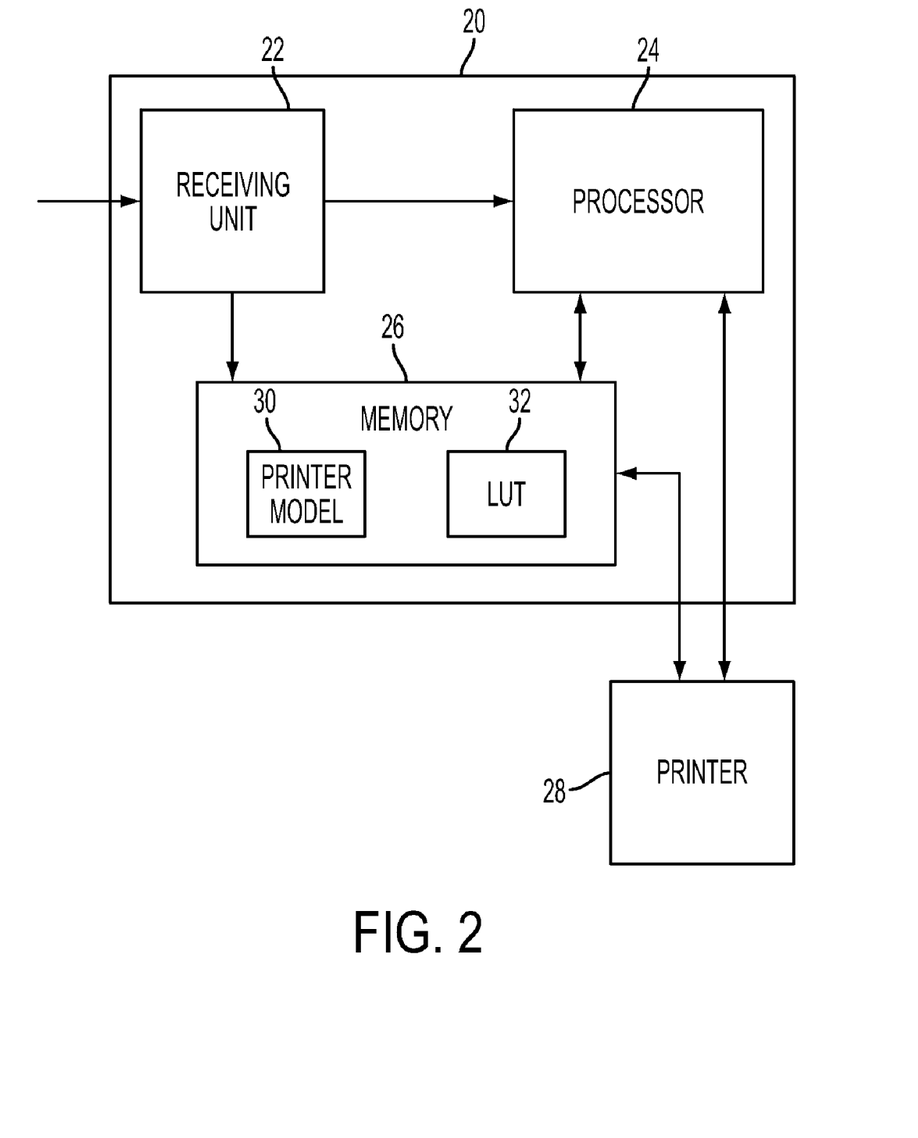
FIG. 2 shows a printing apparatus according to an exemplary embodiment of this disclosure.

With reference to FIG. 2, shown is a printing system according to an exemplary embodiment of this disclosure. The printing controller 20 includes a receiving unit 22 that receives color signals to be printed or output. A memory 26 stores the received color signals and further stores a printer model 30 and a printer profile LUT 32 which is generated, for example, according to a method as illustrated in FIG. 1. The controller 20 includes a processor 6 that can be configured to implement data processing and control algorithm, such as, but not limited to, three input-four output feedback controllers and four input-three output feedback controllers. Controller 20 is operatively connected to printer 28. Notably, printing controller 20 generates a printer profile LUT by means of a printer model 30 or a printer 28. However, according to another exemplary embodiment of the printing controller, the printer profile LUT 32 is generated by using a feedback control loop including a marked substrate from the printer, for example, but not limited to a marked sheet and marked photoreceptor belt.

Figure 3:
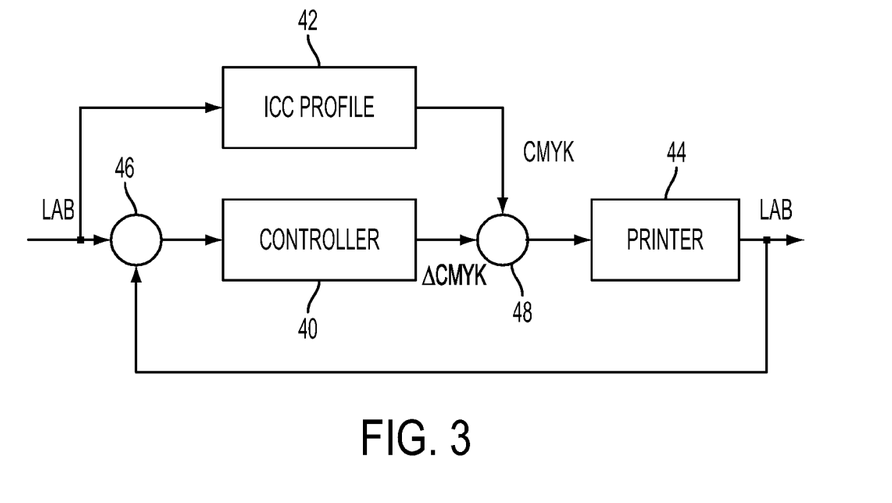
FIG. 3 shows a block diagram of a printing device control system for rendering color images on a printer according to an exemplary embodiment of this disclosure.

With reference to FIG. 3, illustrated is a block diagram of a printing device control system for marking color images on a substrate according to an exemplary embodiment of this disclosure. The control system includes an ICC profile LUT 42, a controller 40, a printer 44, a comparator 46 and an integrator/summer 48.

In operation, the controller receives a first device independent color space representation of one of a plurality of target colors, for example LAB. The LAB data is fed to the ICC profile to transform the LAB device independent color space data to device dependent color space data, for example CMYK which includes the implementation of a historical GCR profile. Subsequently, the printer 44 and/or printer model generate a device independent color space output in LAB which is compared to the input LAB at comparator 46. Any error associated with this comparison is fed to controller 40 which generates a delta CMYK. The delta CMYK is added to the ICC profile LAB value and processed to determine a new LAB value which is again compared to the input LAB at comparator 46. This process is performed iteratively until achieving an acceptable error and the final CMYK values are associated with their respective LAB target colors in a final multidimensional LUT, also referred to as the ICC profile.

Figure 4:
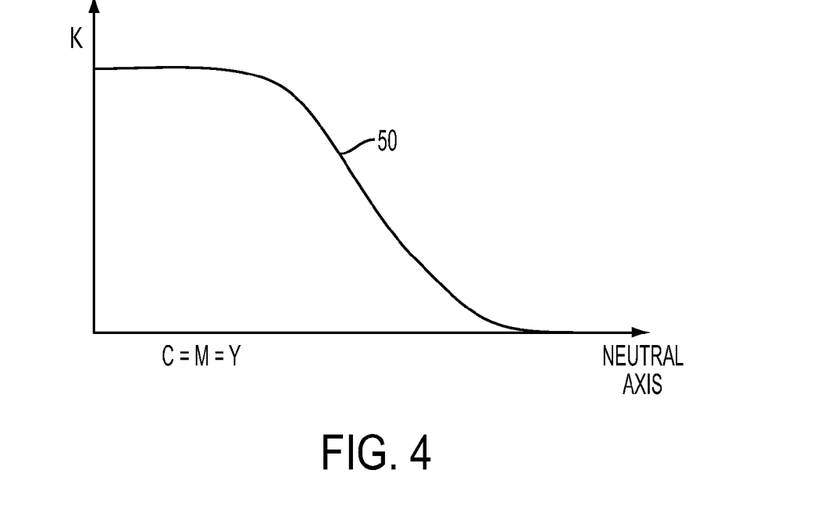
FIG. 4 graphically illustrates one GCR strategy for neutral axis nodes according to an exemplary embodiment of this disclosure.
Figure 5:
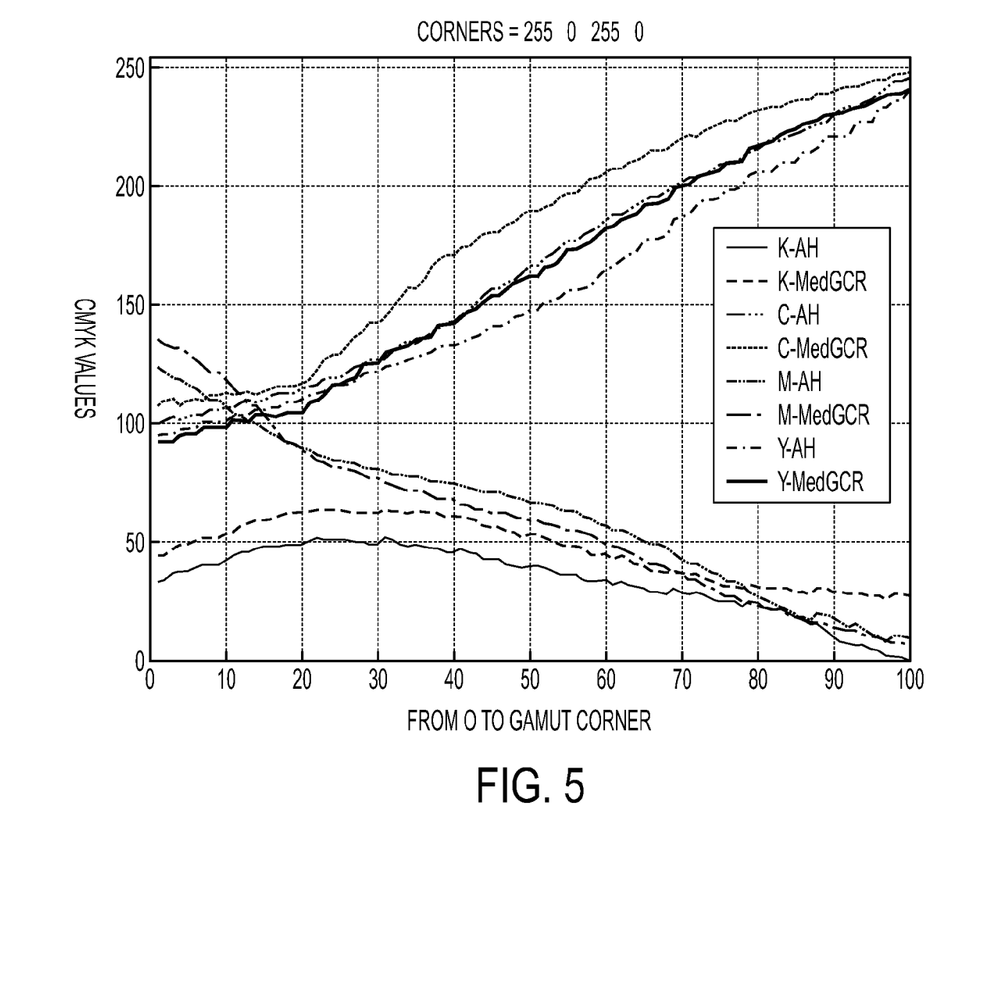
FIGS. 5-10 show corner plots for two different ICC profiles according to an exemplary embodiment of this disclosure.
Figure 6:
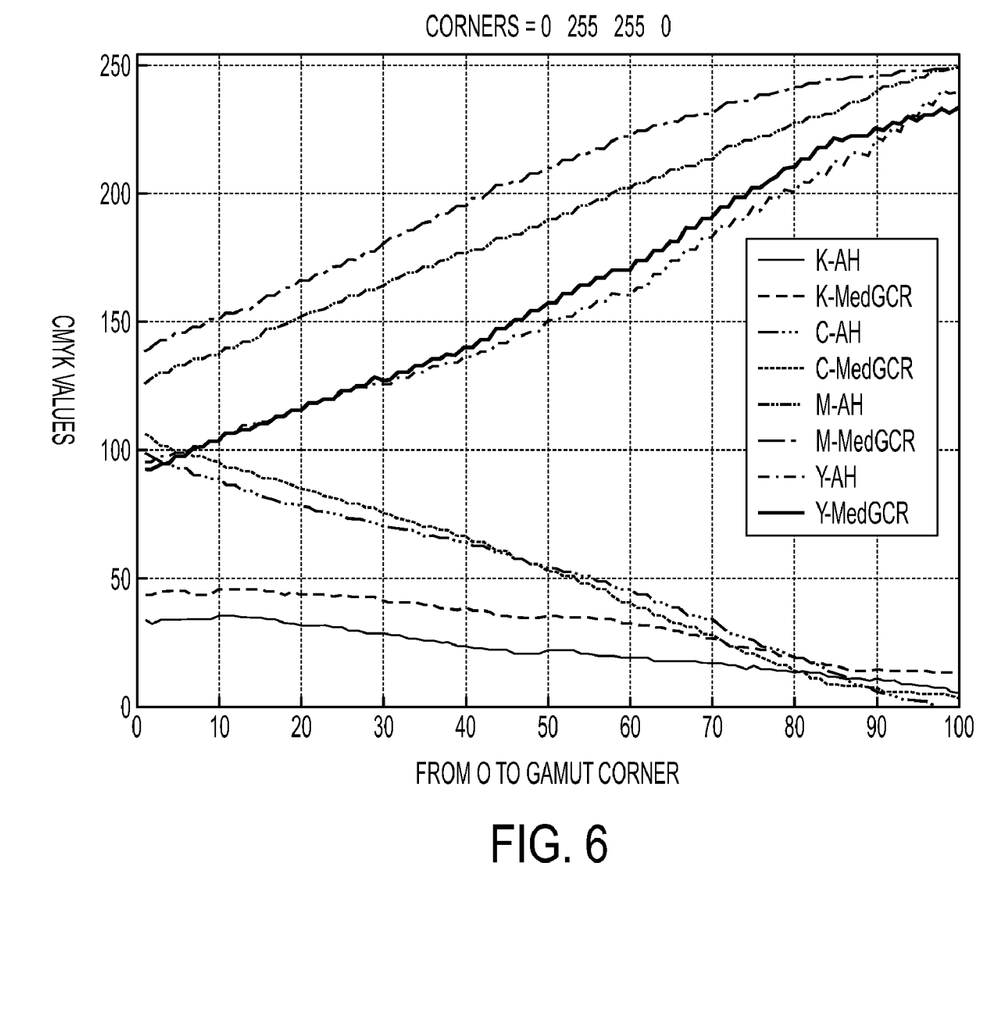
Figure 7:
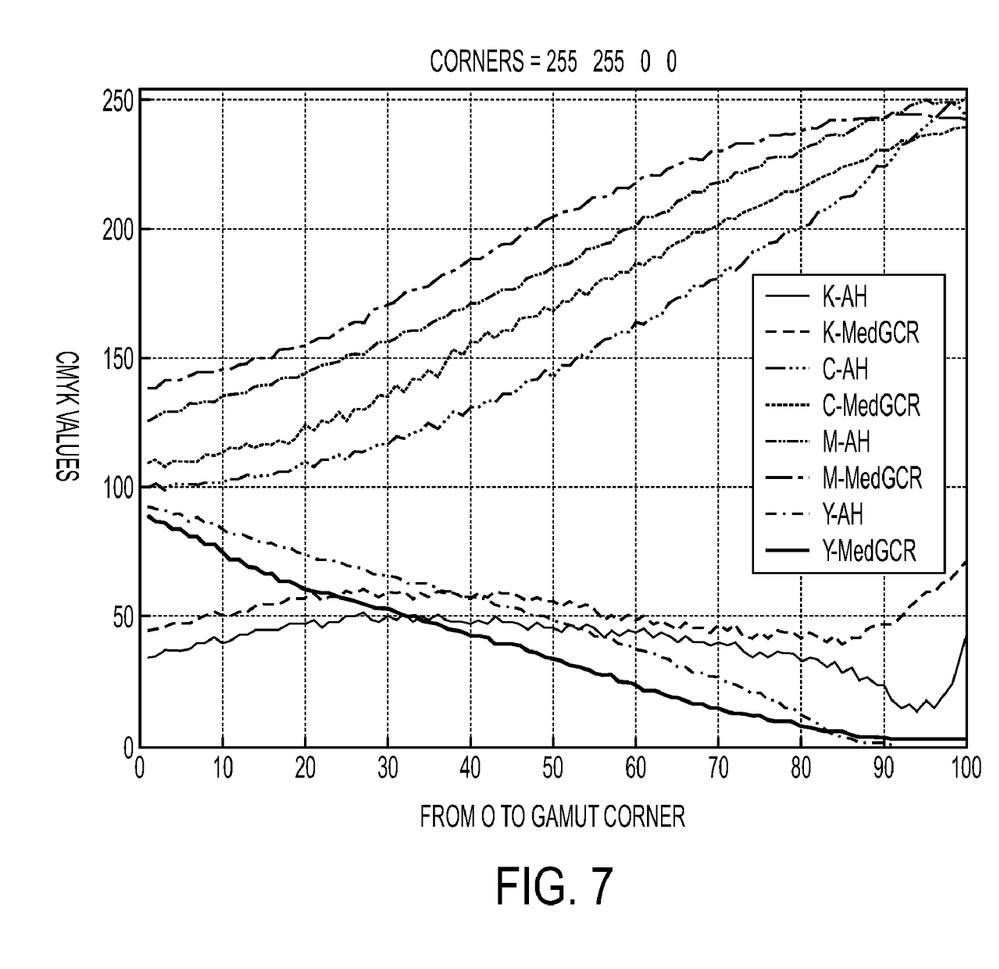
Figure 8:
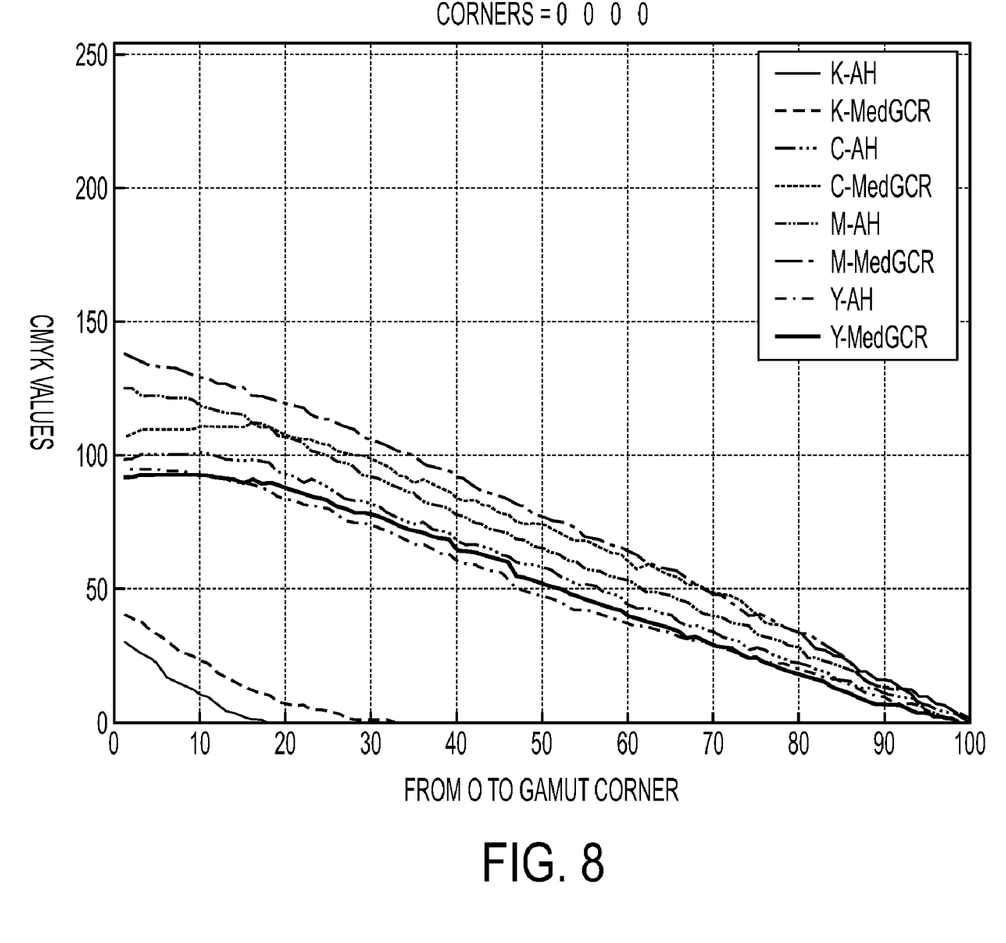
Figure 9:
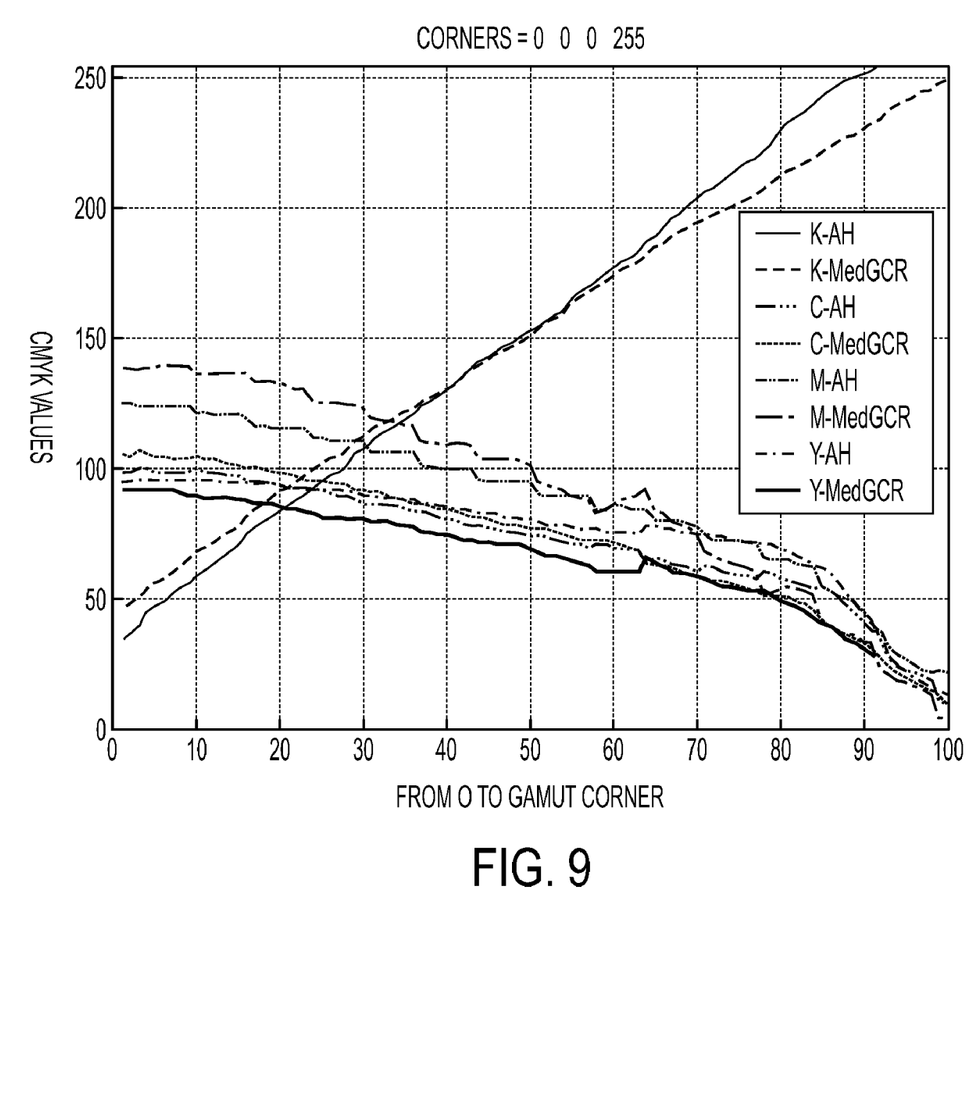
Figure 10:
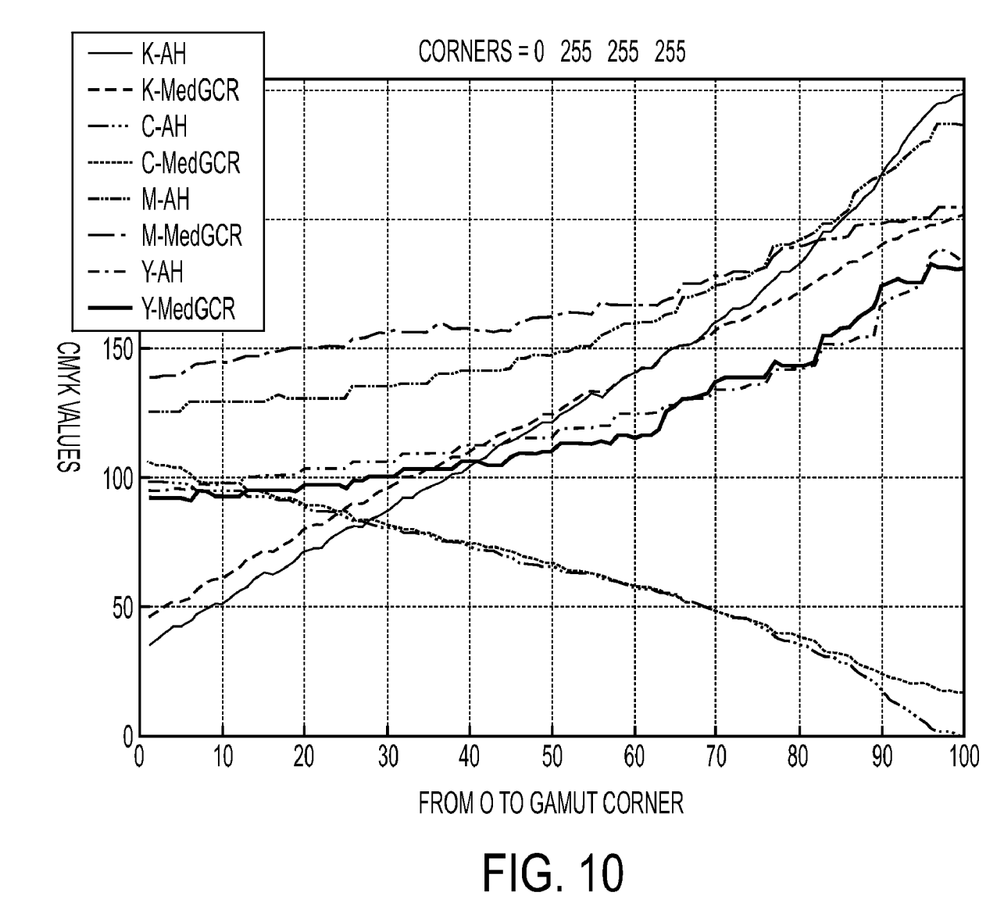

With reference to FIG. 4, illustrated is a plot 50 of a GCR strategy which may be incorporated into an ICC profile according to an exemplary embodiment of this disclosure.

The corner plots shown in FIGS. 5-10 contain CMYK profiles for two different ICC profiles drawn to rays obtained from the color values of $L^*=55$ $a^*=15$, $b^*=0$ to six different critical corners of a printer gamut (red, green, blue, white, black and dark red). The first profile is constructed using the CMYK values extracted from step #3 of FIG. 1, whereas the second one is generated using the CMYK values from step #8 of FIG. 1. Therefore, it is shown how the GCR retrieval method described with reference to FIG. 1 helps to track the CMYK values across the rays. The legends shown as C-AH, M-AH, Y-AH, K-AH are for CMYK values along these rays for the final profile obtained from the disclosed method which retrieves the CMYK values from a medium GCR profile. Thus for this experiment, the desired profile is a medium GCR. The curves shown with "MedGCR" were produced for the desired GCR. The differences between the CMYK values across two profiles are coming from the printer models since the most recent printer model was not used in step #4. A first printer model for curves with extension "MedGCR". Whereas, a second more recent printer model was used in creating the profiles with extension "AH".

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for generating a printer profile for a printing device comprising:
    a) receiving color signals defining a plurality of nodes in a device independent color space;
    b) selecting a GCR (Gray Component Replacement) profile from a plurality of GCR profiles based on one or more predetermined criteria;
    c) generating a set of device dependent color space values from the received color signals and selected GCR profile;
    d) running a process to generate the printer profile for the printing device, the printer profile mapping the received color signals to the device dependent color space values, wherein the device dependent color space values include the selected GCR profile; and
    e) performing one of storing the printer profile, further processing the printer profile and communicating the printer profile to a data receiving device, wherein
    step c) comprises generating an initial set of device dependent color space values from the received color signals and selected GCR profile, and
    step d) comprises running the process for one or more iterations to generate the printer profile, the process generating respective device dependent color space values associated with the received color signals which are based on a printer model or a printer, and each iteration of the process reduces the error associated with the device dependent color space values relative to the received color signals.

2. The method according to claim 1, wherein step d) comprises determining a Jacobian and gain matrix for the printer model and the process generating the respective device dependent color space values based on the Jacobian and gain matrix.

3. The method according to claim 1, wherein the one or more iterations is within the range of about 10 to about 50 iterations for the printer model and about 4 for the printer.

4. The method according to claim 1, wherein step d) comprises running the process for one or more iterations to generate the printer profile, the process generating respective device dependent color space values associated with the received color signals which are based on the printing device markings for the device dependent color space values, and each iteration of the process reduces the error associated with the device dependent color space values relative to the received color signals.

5. The method according to claim 4, further comprising:
after step d) and before step e), filtering the device dependent color space values to generate filtered device dependent color space values including smoother contours relative to the device dependent color space values.

6. The method according to claim 5, further comprising:
repeating step d) using the filtered device dependent color space values, the printer profile mapping the received color signals to the filtered device dependent color space values, wherein the filtered device dependent color space values include the selected GCR profile.

7. The method according to claim 1, further comprising:
after step d) and before step e), filtering the device dependent color space values to generate filtered device dependent color space values including smoother contours relative to the device dependent color space values.

8. The method according to claim 7, further comprising:
repeating step d) using the filtered device dependent color space values, the printer profile mapping the received color signals to the filtered device dependent color space values, wherein the filtered device dependent color space values include the selected GCR profile.

9. The method according to claim 1, wherein the color signals are representative of one of RGB color space, CIE L*a*b* color, CIE L*C*H* color space and CIE XYZ color space.

10. The method according to claim 1, wherein the device dependent color space values correlate to the CMYK color space.

11. A printing apparatus controller comprising:
a computer-usable data carrier storing instructions that, when executed by the controller, cause the controller to perform a method for generating a printer profile for a printing device comprising:
a) receiving color signals defining a plurality of nodes in a device independent color space;
b) selecting a GCR profile from a plurality of GCR profiles based on one or more predetermined criteria;
c) generating a set of device dependent color space values from the received color signals and selected GCR profile;
d) running a process to generate the printer profile for the printing device, the printer profile mapping the received color signals to the device dependent color space values, wherein the device dependent color space values include the selected GCR profile; and
e) performing one of storing the printer profile, further processing the printer profile and communicating the printer profile to a data receiving device, wherein
step c) comprises generating an initial set of device dependent color space values from the received color signals and selected GCR profile, and
step d) comprises running the process for one or more iterations to generate the printer profile, the process generating respective device dependent color space values associated with the received color signals which are based on a printer model or a printer, and each iteration of the process reduces the error associated with the device dependent color space values relative to the received color signals.

12. The printing apparatus controller according to claim 11, wherein step d) comprises determining a Jacobian and gain matrix for the printer model and the process generating the respective device dependent color space values based on the Jacobian and gain matrix.

13. The printing apparatus controller according to claim 11, wherein the one or more iterations is within the range of about 10 to about 50 iterations.

14. The printing apparatus controller according to claim 11, wherein step d) comprises running the process for one or more iterations to generate the printer profile, the process generating respective device dependent color space values associated with the received color signals which are based on the printing device markings for the device dependent color space values, and each iteration of the process reduces the error associated with the device dependent color space values relative to the received color signals.

15. The printing apparatus controller according to claim 14, further comprising:
after step d) and before step e) filtering the device dependent color space values to generate filtered device dependent color space values including smoother contours relative to the device dependent color space values.

16. The printing apparatus controller according to claim 15, further comprising:
repeating step d) using the filtered device dependent color space values, the printer profile mapping the received color signals to the filtered device dependent color space values, wherein the filtered device dependent color space values include the selected GCR profile.

17. The printing apparatus controller according to claim 11, further comprising:
after step d) and before step e), filtering the device dependent color space values to generate filtered device dependent color space values including smoother contours relative to the device dependent color space values.

18. The printing apparatus controller according to claim 17, further comprising:
repeating step d) using the filtered device dependent color space values, the printer profile mapping the received color signals to the filtered device dependent color space values, wherein the filtered device dependent color space values include the selected GCR profile.

19. The printing apparatus controller according to claim 11, wherein the color signals are representative of one of RGB color space, CIE L*a*b* color, CIE L*C*H* color space and CIE XYZ color space, and the device dependent color space values correlate to the CMYK color space.

20. A printing system comprising:
an IME (Image Marking Engine);
an image sensor operatively connected to the IME; and
a controller operatively connected to the IME and the image sensor, the controller configured to execute a method for generating an IME profile for the IME, the method comprising:
a) receiving color signals defining a plurality of nodes in a device independent color space;
b) selecting a GCR profile from a plurality of GCR profiles based on one or more predetermined criteria;
c) generating a set of device dependent color space values from the received color signals and selected GCR profile;
d) running a process to generate the IME profile for the IME, the IME profile mapping the received color signals to the device dependent color space values, wherein the device dependent color space values include the selected GCR profile; and e) performing one of storing the printer profile, further processing the IME profile and communicating the IME profile to a data receiving device.

21. The printing system according to claim 20, wherein
step c) comprises generating an initial set of device dependent color space values from the received color signals and selected GCR profile, and
step d) comprises running the process for one or more iterations to generate the IME profile, the process generating respective device dependent color space values associated with the received color signals which are based on an IME model or an IME, and each iteration of the process reduces the error associated with the device dependent color space values relative to the received color signals.

* * * * *